Nov. 20, 1934.    F. RIEBER    1,981,665
EARTH BORE SURVEYING INSTRUMENT
Filed Dec. 2, 1929    4 Sheets-Sheet 2
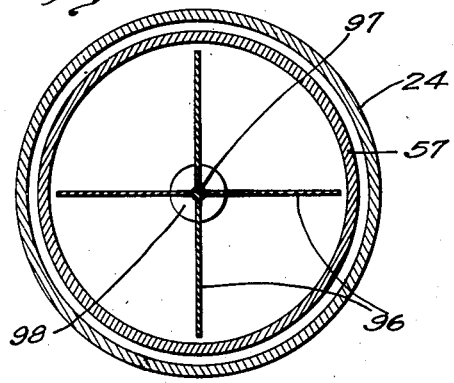
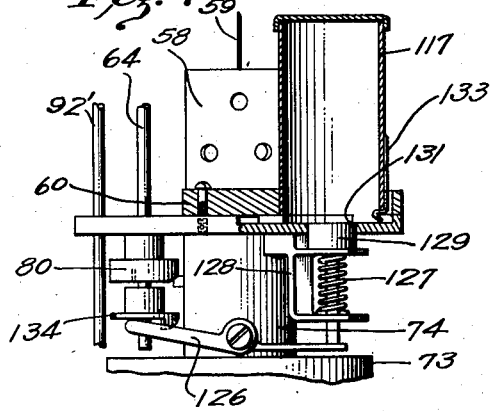
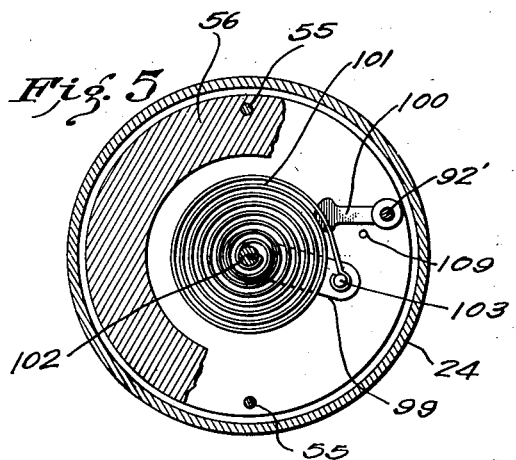
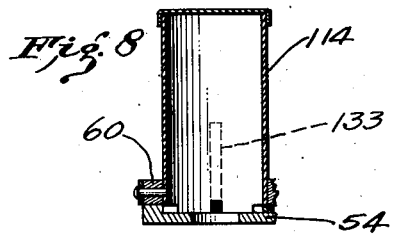
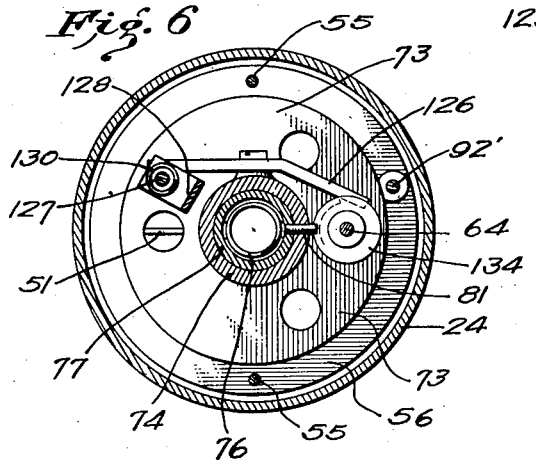
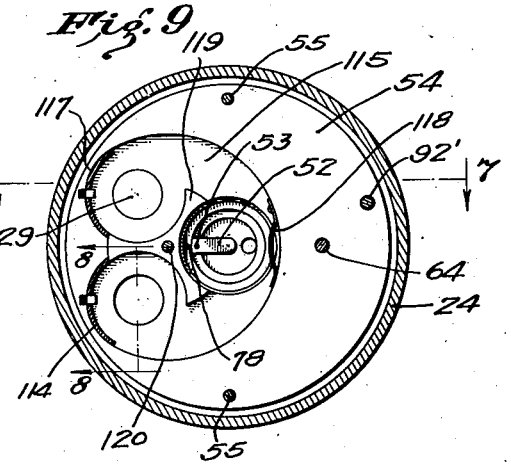
INVENTOR
Frank Rieber
By John Flam
ATTORNEY

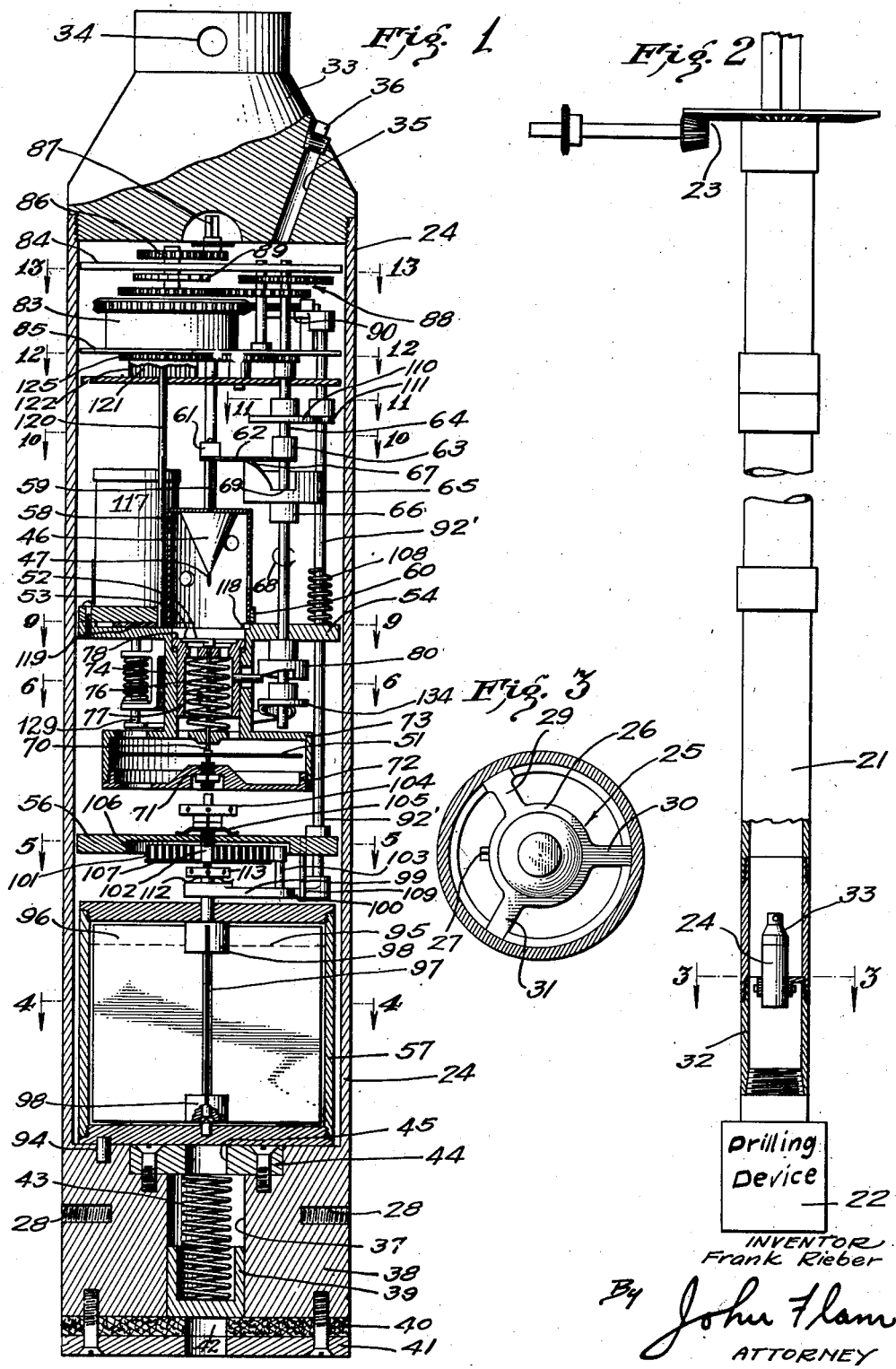

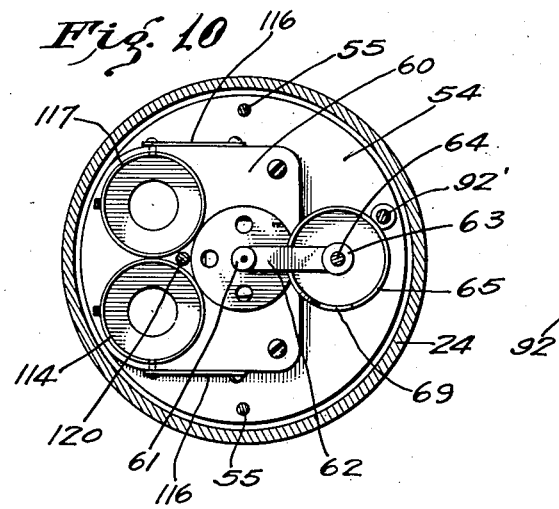
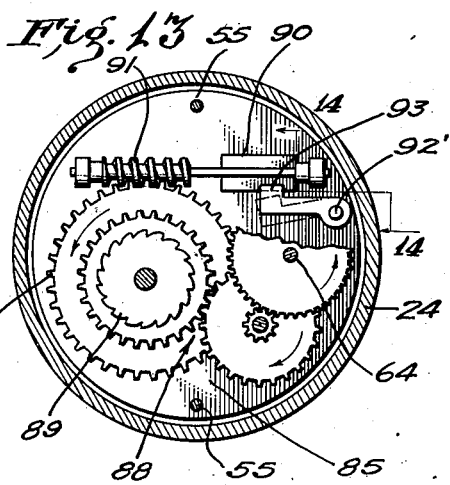
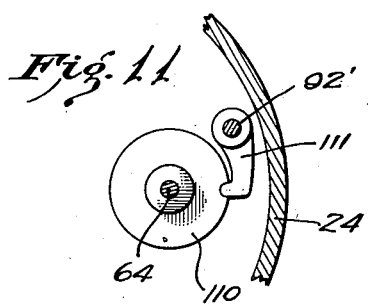
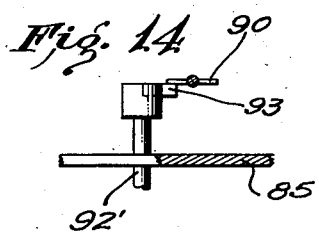
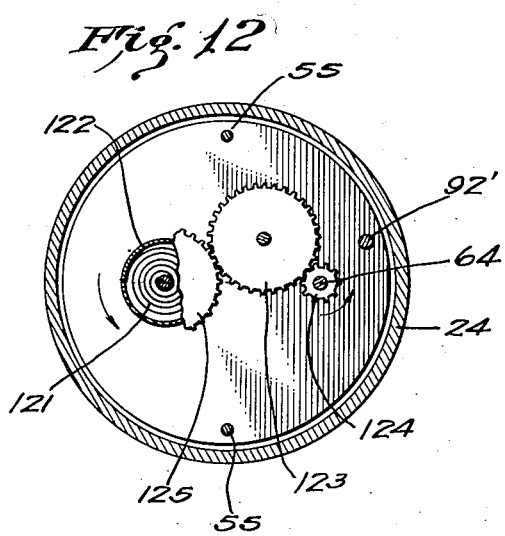

Nov. 20, 1934.   F. RIEBER   1,981,665
EARTH BORE SURVEYING INSTRUMENT
Filed Dec. 2, 1929   4 Sheets-Sheet 4
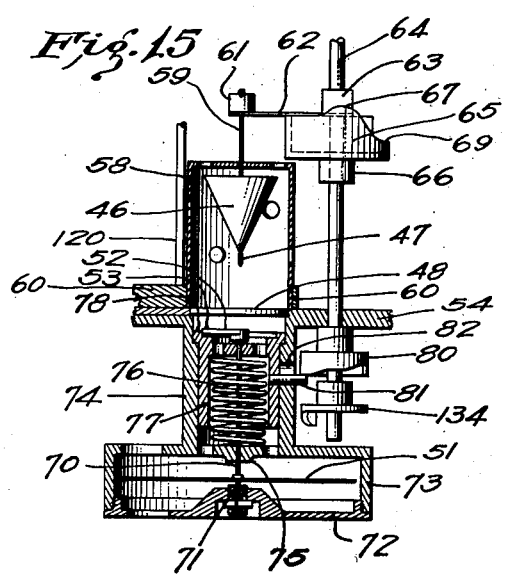
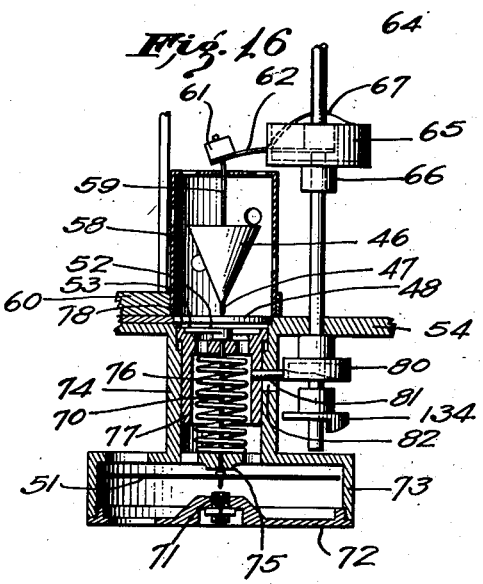
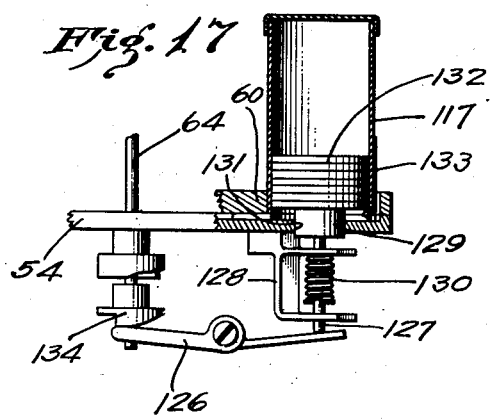
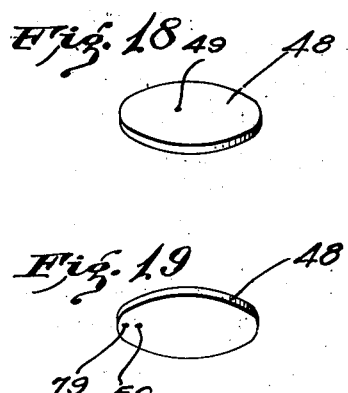
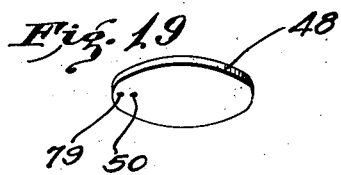
INVENTOR
Frank Rieber
By John Flam
ATTORNEY Patented Nov. 20, 1934

1,981,665

UNITED STATES PATENT OFFICE 1,981,665

EARTH BORE SURVEYING INSTRUMENT

Frank Rieber, San Francisco, Calif.

Application December 2, 1929, Serial No. 411,124

11 Claims. (Cl. 234—5.3)

This invention relates to an instrument for obtaining data regarding earth bores, such as oil wells or the like.

The invention relates to an instrument adapted to be lowered into a bore such as an oil well which is in the process of being drilled to determine the degree of inclination of the bore from the vertical as well as the direction of the inclination in azimuth; more particularly to an instrument in which a succession of definite records can be obtained at various depths without removing the device from the bore.

My instrument can also be used for surveying existing wells, to check up their present condition. In this way, many fields heretofore considered exhausted, may prove to be only partially worked, and by careful drilling of new holes, the unworked portions can be reached.

With the aid of my invention, the records obtained can readily be utilized to interpret the underground conditions; and especially since the preferred form of the record is that of a thin disc. The position of the north point of the compass is marked thereon by a small indentation near the edge thereof. The divergence of the plumb bob from coincidence with the axis of the instrument (which is a measure of the slant of the bore) is indicated by another small indentation, the distance of which from the center of the disc that coincides with the axis of the instrument, is a measure of the angle of slant.

In this connection, it is another object of my invention to provide an inertia device of an improved form.

It is still another object of my invention to ensure against accidental or undesired operation of the record taking means, as may be occasioned for example when the drill stem is progressing by jerks, or when it slows down. To operate my device designedly, it is essential to speed up the rotation of the drill stem or of the instrument and then to stop it. Stopping the stem from the usual speed will not cause the record taking mechanism to become active; likewise sudden jerks will also be ineffective.

In some cases, the drill may become caught in the formation, and due to the length of the stem, it is possible to twist the stem around several times before the drill is released. Under such circumstances, there is a sudden acceleration of the drill, and if no precautions be taken, such acceleration may result in the taking of a record. It is another object of my invention to ensure against this form of improper operation.

In the use of my instrument, a log must be kept so that the succession of records obtained can be properly related to the depths at which each record is taken. This can be readily accomplished by lowering the instrument to the desired level, and keeping a record of the level so that the record obtained at that level will be properly associated.

Referring to the drawings:

Figure 1 is a longitudinal sectional view of a complete instrument embodying my invention;

Fig. 2 is a diagram showing how the instrument can be incorporated in a drill stem;

Fig. 3 is an enlarged sectional view, taken along plane 3—3 of Fig. 2;

Figs. 4, 5, and 6 are detail sections, taken respectively along planes 4—4, 5—5, and 6—6 of Fig. 1;

Fig. 7 is a detail section taken along plane 7—7 of Fig. 9;

Fig. 8 is a detail section taken along plane 8—8 of Fig. 9;

Figs. 9, 10, 11, 12, and 13 are further detail sections, taken respectively along planes 9—9, 10—10, 11—11, 12—12, and 13—13 of Fig. 1.

Fig. 14 is a detail section taken along plane 14—14 of Fig. 13;

Figs. 15 and 16 are fragmentary views, similar to a part of Fig. 1, but showing different stages in the cycle of operation of the recording device;

Fig. 17 is a view similar to Fig. 7, but showing a different stage of operation of the record collecting device; and Figs. 18 and 19 are pictorial top and bottom views of a disc record made with the aid of my instrument.

A drill stem 21 is shown in Fig. 2, formed in the usual way, as by pipe sections, and provided at the bottom with a drilling device 22. This may be any desired form of drill bit or core barrel. In order to show one means for rotating this stem, there is indicated gearing 23 at the top of the stem. In the present instance, my instrument is shown as accommodated in a capsule 24 that is fastened between two pipe sections near the bottom of the stem 21. Of course, this method of supporting can be varied, since in the survey of existing wells, the drill stem support is not available and any desired rotary support could be used.

As a convenient form of supporting the capsule 24 in definite angular relation to the drilling implement 22, I show a spider 25 (Fig. 3) having a hub 26 that engages the outside of the capsule 24. Set screws 27 are arranged to project through the walls of hub 26 and into tapered apertures such as 28 (Fig. 1) in the bottom portion of the capsule. The arms 29, 30, 31 of the spider 25 are arranged to fit into slots in the top edge of the lowermost pipe section 32. By making the width of these arms unequal, as for example by making the end of arm 29 wider than the other arms, and the corresponding slot in section 32 wider to accommodate it, it is assured that the spider 25 will always be placed in the section 32 in a definite angular relation thereto. This feature is important because it may be necessary at times to be able to orient the record obtained with the drill member 22, especially when cores are taken from the earth.

The details of the capsule 24 are most clearly disclosed in Fig. 1. It has a tightly fitting cap 33 which is threaded into the body of the capsule 24, and which can conveniently be provided with an eye 34 for facilitating transportation or lifting. The capsule interior is filled with an inactive liquid that is preferably a lubricant, such as oil, within which all of the working parts of the instrument are immersed. For facilitating the filling of oil, a bore 35 is provided in the cap 33, which bore can be tightly closed by a plug 36.

Of course, in deep wells, the instrument and its capsule 24 are subjected to considerable hydraulic pressures, and it is advisable to maintain the pressure inside and outside the capsule 24 at about the same value, so that no great crushing force shall be exerted on the exterior wall of the capsule. For this purpose, there is used a plunger device near the bottom of the capsule which is subjected to the exterior pressures and which serves to compress the fluid in the capsule in accordance with these external pressures.

Thus there is a bore 37 in the bottom wall 38, in which there is slidable a plunger 39. A gasket 40 (of felt or the like) is tightly held at the bottom of the capsule as by plate 41, and it has an aperture 42 smaller than the plunger 39. This structure thus defines an edge against which plunger 39 is urged, as by a compression spring 43. The top of this spring is held in place by a top plate 44 having an aperture 45 leading into the interior of capsule 24. Thus when the capsule is subjected to a large pressure, the plunger 39 is urged by this pressure inwardly to compress the fluid in the capsule to about the same value as that which exists on the exterior of the capsule. Since oil, which is used for the capsule filling, is not very compressible under pressure, only a slight movement of plunger 39 need be provided for.

The spring 43 ensures seating of the plunger 39 even when the capsule 24 is out of the well, to ensure against loss of the oil. This oil of course extends down through aperture 45 into aperture or bore 37 and on top of plunger 39, so that as this plunger is urged upwardly by fluid pressure through aperture 42, this oil is placed under compression.

The capsule 24, as before stated, carries all of the operating parts. These parts include a plumb bob 46 (Figs. 1, 15 and 16) having a pointed tip 47, which is adapted to be dropped from a distance onto a record disc 48 (Figs. 15, 16, 18 and 19) to indent a mark 49 on its top surface. This disc can conveniently be made from some soft and readily indentable material, such as aluminum. The distance of the mark 49 from the center of disc 48 is a measure of the angle of inclination of the capsule axis because when this axis is exactly vertical, the plumb bob 46 is arranged to be exactly central of disc 48.

In order to record the direction of the inclination, another indentation can be made on the disc to show a definite compass point; that is, so that the disc can be placed in proper relation in azimuth after it is removed from the instrument, to show the direction of deviation of the bob from the central position of the disc. In the present form of the instrument, a punch mark 50 (Fig. 19) is used on the bottom of the disc near its edge, which can be made by the aid of a compass or other direction indicating device. In this instance I show a conventional form of compass 51 that can be used for this purpose.

The arrangement is such that the marks 49, 50 are placed on the record disc 48 at any desired time. More particularly, the bob 46 is released to drop onto the disc 48, and the compass structure including its shaft 70, crank 52 and punch or point 53 is also urged upwardly to drive said point 53 onto the lower surface of the disc. I shall now describe the mechanism whereby these actions are secured.

I provide a flat support 54 held on rods 55 (Figs. 9 and 10) fastened to a lower plate 56 (Fig. 1). This plate in turn is held by appropriate posts on top of a casing 57. Fastened on top of the support 54 is a cage 58 in which bob 46 is accommodated. This cage as shown in Fig. 7, is held in place by an aperture in a plate 60. The plumb bob string 59 passes through a fairly close aperture in the top of cage 58 and carries a collar 61 at its top end. A spring arm 62 extends from the collar and has a hub 63 that slides on a vertical post or shaft 64 (Figs. 1, 10, 15, 16). This shaft is rotatable and forms one element of a mechanism whereby the plumb bob 46 is controlled.

Thus for example, shaft 64 may carry a crown cam 65 fastened as by hub 66 to shaft 64. This cam has a high portion 67 that lifts bob 46 so as to be snug against the top of cage 58, while the device is inactive. This position is shown in Fig. 1. In Fig. 15, the cam 65 is shown in the second position, the bob 46 being dropped slightly below the top of cage 58. This is caused by a slight rotation of shaft 64 in the direction indicated by arrow 68 of Fig. 1. After shaft 64 rotates about three-fourths of a revolution, arm 62 can drop suddenly into the low point 69 (Fig. 1) to drop the bob downwardly onto record disc 48, as shown in Fig. 16. The parts are so proportioned that this drop is just sufficient to produce a legible mark on the disc. The completion of one revolution of the shaft 64 again brings the high part 67 of the cam 65 into action, to hold the bob snugly in place. A complete revolution of the shaft thus releases the bob, drops it, and then relocks it. The manner in which this complete revolution is imparted to the shaft 64 under the control of the operator will be hereinafter described.

I shall now describe how the compass 51 is operated to impart its record to the disc 48.

The compass shaft 70 while the device is inactive, is lifted slightly off a step bearing 71 as shown in Fig. 1. This bearing is located in the bottom cap 72 of a compass casing 73. This compass casing has a tubular extension 74 that is attached to the support 54. Shaft 70 is guided for vertical movement in a hub 75 in the upper wall of the case 73. It is of course understood that the oil in the capsule 24 is free to circulate inside this case, so as to serve as a damper for the compass.

In order to urge the compass structure upwardly, there is utilized a compression spring 76. The lower end of this spring abuts the top surface of case 73, and it surrounds shaft 70. Its upper end acts against the hub of a spring barrel 77 that is slidable in extension 74. This hub is in contact with the hub of crank arm 52, whereby when spring 76 is free to act, this arm moves upwardly, carrying with it the point 53, as well as shaft 70 and compass 51. Barrel 77 can if desired be provided with another point 78 (Figs. 15, 16) near the edge thereof to provide a punch mark 79 (Fig. 19) on the record disc 48, to indicate the position of the drill stem also with respect to the compass. This may be advisable when cores are taken from the hole.

The spring barrel 77 is arranged to be held against upward movement until the time the record is taken. To control this movement, the shaft 64 can be utilized. Thus this shaft carries another crown cam 80 that coacts with a pin or stub 81 fastened radially to barrel 77 and extending through a slot 82 in extension 74. This cam 80 has an intermediate portion that holds pin 81 in an intermediate position while the device is inactive, as shown in Fig. 1. During the first part of its revolution, it urges pin 81 downwardly so that the compass structure is entirely free to aline itself on bearing 71, as shown in Fig. 15. The rate of revolution of shaft 64 is purposely made slow enough so that the compass structure is maintained in this free position long enough to let the compass 51 come to rest. During the latter part of the revolution of shaft 64, the low part of cam 80 becomes active, and spring 76 is released, lifting both points 53 and 78 sharply against the bottom surface of disc 48, as shown in Fig. 16. Upon completion of the revolution of shaft 64, the compass structure is returned to the intermediate position of Fig. 1.

It is thus seen that a complete revolution of shaft 64 will cause the recording device to make its record. Knowing the length of the bob below the lower surface of the cover of cage 58, it is easy to calculate the angle of deviation from the vertical; and its direction in azimuth is also obtainable from the compass punch 50. It is possible with the aid of my instrument to cause shaft 64 to revolve through one revolution at will. I shall now describe how this shaft is controlled.

In the upper part of capsule 24, a spring motor 83 is provided. This motor is accommodated between spaced plates 84, 85 supported as by the aid of posts 55. By the aid of a conventional train of gearing 86, ratchet 89 (Fig. 13) and a key shaft 87, this motor can be wound up before it is placed in the capsule. By the aid of further reduction gearing 88 (Figs. 1, 13), this motor is geared to shaft 64. A fly governor 90 (Fig. 13) is geared as by worm 91 to a wheel 92 moved by the motor 83, in order to maintain the speed of shaft 64 at a desired slow rate. However, this fly is obstructed by a stop 93 fastened to shaft 92', but it can be released when this shaft is rotated in a counterclockwise direction as viewed in Fig. 13.

In order to rotate this shaft so as to free the motor 83, I use an inertia device that is operative when capsule 24 is first rapidly rotated, and then stopped. This inertia device is contained in the casing 57. This casing is fluid tight, and rests as shown in Fig. 1, on the bottom of capsule 24. It is fixed in relation to the capsule as by a pin 94. It is almost entirely filled with a heavy liquid 95, such as mercury; thus when capsule 24 is rotated, this liquid also rotates, but when the capsule is stopped, the mercury continues its rotation. This rotation operates on paddles 96 (Fig. 4) to rotate a shaft 97 to which the paddles are attached. This shaft carries the hubs 98 to which the paddles 96 are securely attached.

This shaft 97 extends out of the casing 57, as shown in Fig. 1. The rotation of capsule 24 in a clockwise direction as shown in Fig. 5, carries the whole recording device around also in a clockwise direction, as well as shaft 97. However, if this capsule is stopped, shaft 97 will continue to rotate due to the inertia of mercury 95. In order to utilize this rotation for tripping shaft 92', there is attached a crank arm 99 (Figs. 1 and 5) to the paddle shaft 97. This arm normally abuts against a crank 100 attached to shaft 92', which crank 100 prevents movement of arm 99 in a counterclockwise direction, since shaft 92 is stopped against clockwise rotation due to the engagement of detent or arm 93 with the fly 90. However, upon stoppage of capsule 24, the arm 99 continues its clockwise rotation due to the impelling force of mercury 95 in casing 57.

This rotation of arm 99 is resisted by a resilient device in such a manner that it cannot rotate sufficiently to initiate the recording operations unless the capsule had been stopped from a speed well above normal drilling speeds. This resilient device is in the present instance, a spiral spring 101 (Figs. 1 and 5). Its inner end is fast on a shaft 102 that is supported in plate 56. Its outer end is anchored to a post 103 on arm 99. Its tension can be adjusted, as by turning a capstan 104 on shaft 102 so as to determine the degree of resistance of the spring to its winding up. For example, shaft 102 can have a very fine thread engaging in support 56 and it can be held in the desired adjustment by a flat spring 105 that is interposed between this support and the capstan. The spring 101 can be partially accommodated in a hollow 106 in the bottom of support 56 and shaft 102 can support a disc 107 to ensure that the spring will be confined in a comparatively narrow place.

By proper adjustment of this spring 101 in the manner outlined, it is possible so to set the mechanism that only upon stoppage of the drill stem rotation from a speed materially exceeding its normal speed, will the arm 99 travel so far around in a clockwise direction (Fig. 5) to strike crank 100 with a force sufficient to rotate the shaft 92' to unlock fly 90. This unlocking movement of shaft 92' is opposed by a spring 108 (Fig. 1) just sufficiently to ensure this mode of operation. A stop 109 (Fig. 5) is provided to limit the unlocking motion of shaft 92' and arm 100.

As soon as shaft 92' moves sufficiently to unlock fly 90, the main operating shaft 64 is rotated by motor 83. To ensure a complete rotation of this shaft and no more or less, a notched disc 110 (Figs. 1 and 11) is fastened to shaft 64, the notch of which is arranged to coact with a detent 111 fastened to shaft 92'. When shaft 92' rotates to unlocking position, detent 111 releases disc 110 fast on the shaft 64. Even after arm 99 moves away from crank 100, this detent, riding on the periphery of collar or disc 110, prevents shaft 92' from returning to locking position until the notch is again in alinement with the detent 111. At that time, a complete revolution having been accomplished, detent 111 is urged into the notch by spring 108, and shaft 92 moves the fly detent 93 to the active position shown in Fig. 13.

It is quite possible that when the drill stem is stopped and given a very sudden start, crank 100 may strike arm 99 with such great impact as to carry it around, as well as the paddle wheel and the mercury 95. The inertia of the mercury thus set in motion may serve to carry the arm 99 for a full revolution. In order to prevent such undesired motion of the arm 99, it is merely frictionally held to shaft 97, as by a friction washer 112. The compression of this washer and consequently its friction clutching effect, can be adjusted by a capstan 113 threaded on shaft 97. This friction is so adjusted that any sudden impact will merely cause the arm 99 to slip on shaft 97, against the inertia of mercury 95.

There is provided a succession of blank discs such as 48, one for each operation of the device. A magazine 114 is held removably in a support 60 fastened to the top of plate 54, as by a spring finger 116 (Fig. 10). This magazine holds the blank records in place, the bottom one resting directly on a surface 115 of plate 54. A receiving magazine 117 of similar structure is also located in the support 115. These two magazines, together with the space below the plumb bob cage 58, form a symmetrical triangular arrangement as shown clearly in Fig. 9. Thus a disc is taken from the bottom of the stack in magazine 114, permitting the stack to drop by the thickness of one record disc. It is moved through an opening in the side of magazine 114 to a position immediately above the crank arm 52 and below bob 46, where it is retained by a spring 118 against upward vertical movement. This spring is a flat spring fastened to the wall in depression 115. After the record is completed, it moves into magazine 117 where it is retained in a manner to be described shortly, while a new, blank disc is substituted for it below cage 58.

This movement of the discs from magazine 114, beneath cage 58, to magazine 117, is accomplished by the aid of a spider 119 that has indentations as shown in Fig. 9 to receive the discs. This spider is mounted on a vertical shaft 120 urged in a counterclockwise direction, as by a spiral spring 121 (Figs. 1 and 12), the inner end of which is fastened to the shaft. The outer end is attached to a barrel 122 that is wound up as by gears 123, 124, 125 from shaft 64. Thus when shaft 64 makes its revolution for each recording operation, it winds up spring 121 by a third of a revolution to compensate for a third of a revolution that spider 119 makes to shift the record discs by one step through the stages heretofore explained.

Spider 119 cannot rotate to move the disc 48 out from under cage 58 while there is a disc at the bottom of receiving magazine 117, because this bottom disc is urged against the left hand side wall (Fig. 9) of the magazine by the spider, and this wall serves as a stop for the rotation. However, as soon as the record is completed, matters are so arranged that this bottom disc is lifted out of the way, to permit spring 121 to move the spider. This lifting mechanism is most clearly disclosed in Figs. 6 and 7.

Pivoted on the outside of extension 74 is a lever 126. One end of this lever abuts against a stem 127 guided in bifurcated guide 128, and carrying a plunger 129. A spring 130 between the arms of the guide urges this stem downwardly in contact with lever 126. Plunger 129 extends through a hole 131 in part 115, which is of substantially smaller diameter than the discs 48. Thus upon raising stem 127 by rocking of lever 126, this plunger as shown in Fig. 17, will raise the stack 132 of finished records off the bottom of the magazine 117 so as to permit the spider 119 to rotate with the record disc 48 that is in the cage 58, until the edge of that disc contacts with plunger 129. This rotation is accomplished by the aid of the spring 121. Now, when plunger 129 is withdrawn to the position of Fig. 7, the completed record 48 is urged by spider 119 entirely into the magazine 117 to form the bottom of the stack.

Thus each succeeding record is deposited on the bottom of stack 132, the records thus being kept in the order they were taken. If considered desirable, spring fingers 133 can be used to hold the lifted stack in the position of Fig. 17 while the new record is being placed in the magazine.

While the completed record is thus moved into magazine 117, a new blank disc is moved from the bottom of the blank record magazine into the space beneath the bob 46. The stack of blank records merely falls by gravity after the bottom disc is thus shifted, so that upon the next operation, another arm of spider 119 can shift the bottom record into active position.

In starting the entire device in operation, there should be one blank record in magazine 117 to hold spider 119 against continued rotation; and all succeeding records will properly be disposed in this magazine, as just described.

The operation of lever 126 is performed upon completion of the recording cycle, and just before the cycle of movement of main operating shaft 64 ceases. Thus at the end of this shaft there is still another crown cam 134 (Figs. 16, 17) that coacts with the end of the lever to give it a quick reciprocation after the plumb bob 46 and compass 51 are returned to the position of Fig. 1.

It is thus seen that a cycle of operation of shaft 64 will cause not only a record to be taken, but a deposition of the completed records in regular order.

It is desirable in most instances to accommodate capsule 24 in a section of the drill stem which is non-magnetic. Thus in Fig. 2, section 32 and the one above it can if desired be made from brass. This enhances the accuracy of the compass readings.

It is now possible to summarize the complete functioning of the apparatus.

First the magazine 114 is loaded with blank discs and put into place on support 60. Magazine 117 is provided with one slug or blank to hold spider 119 against rotation. Then the capsule 24 receives the whole device, and it is fastened into a drill stem or the like. When the stem is lowered to a point where a record is to be taken, a note is made of the depth; the stem is rotated well above normal speed and stopped. This causes arm 99 to hit crank 100, rotating shaft 92′ to unlock fly 90.

Shaft 64 is thus permitted to rotate through a definite cycle; in the present instance, through 360°. The cams 65 and 80 cause the plumb bob 46 and the compass 51 to make the record; then cam 134 causes the plunger 129 to be moved up to permit the record just made to enter beneath the stack in magazine 117; and upon withdrawal of this plunger, the spider 119 completes its one-third revolution to position a new blank in active position. The position of the new blank can be described in connection with Figs. 1 and 9. The spider 119 is urged by spring 121 to rotate in a counterclockwise direction; but is prevented from rotating by engagement of the lowermost disc in magazine 117 with the left hand wall of this magazine. However, as soon as the marking of the disc is accomplished, the plunger 129 moves this lowermost disc out of the way, and permits the spider 119 to make one-third of a revolution, to bring the newly marked disc into the bottom of magazine 117. As soon as the plunger 129 is removed the newly marked disc proceeds until it abuts the left hand wall of magazine 117.

At the same time the lowermost disc in magazine 114 is moved by the spider 119 to recording position.

The shaft 64 is relocked upon a complete revolution by detent 111, and detent or stop 93 stops the rotation of the spring motor 83. The apparatus is now ready for a succeeding operation, which can be accomplished after the capsule 24 is moved to a location where the next record is to be taken.

When all the records are taken, the magazine 117 is removed and the discs 48 are retained in regular order to agree with the log kept as to the depths where the records were taken. These records can be analyzed by the aid of a chart that shows the deviation as a function of the spacing of the mark 49 from the center of the disc 48, and its position in azimuth can be determined by the aid of mark 50.

I claim:

1. In an inclination indicating device having a blank record magazine, a magazine for completed records, means providing a space for a blank to enable it to be operated upon, means for successively moving a blank first to said space and then into the completed record magazine, a direction marking member, and inertia controlled means for causing the direction marked to operate in the space and for causing the record blank moving means to operate.

2. In an indicating device, a magazine for holding record blanks, a magazine into which the records can be passed, means providing a space where a blank can be held for making a record thereon, a member movable for shifting the record blanks in steps from the blank magazine into the space, and from the space into the record magazine, said member having arms adapted to be engaged by the bottom blank in the blank magazine, so as to move this blank laterally out of the magazine, and means temporarily holding the records in the record magazine above the lower surface thereof to permit the entry of the completed record when it is moved by the member.

3. In combination, a pair of disc magazines; a plumb bob, a cage for the bob, means for successively moving a disc from the bottom of one magazine to a position beneath the cage, and from this position into the other magazine, and means for dropping the plumb bob down onto the disc beneath the cage.

4. In a device of the character described, a direction indicating means, and means controlled by inertia for recording the indication of said indicating means, including a heavy liquid, and a paddle wheel operated by the movement of the liquid.

5. In an earth bore surveying device, a body adapted to be lowered into the earth bore, recording means carried by said body, means for causing the recording means to operate through a cycle, and means whereby rotation of said body in the bore at a rate above a predetermined value only, and stopping of said rotation, initiates the operation of said recording means.

6. In an earth bore surveying device, a body adapted to be lowered into the earth bore, recording means carried by said body, means for causing the recording means to operate through a cycle, means whereby stopping of the rotation of the body causes the recording means to operate, and means whereby a sudden starting of rotation is ineffective to cause operation of the recording means.

7. In an earth bore surveying device, a body adapted to be lowered into the earth bore, recording means carried by said body, means for causing the recording means to operate through a cycle, and means whereby rotation of said body in the bore at a rate above a predetermined value only, and stopping of said rotation, initiates the operation of said recording means, comprising an arm, an inertia member for driving the arm, and means providing an adjustable opposing force to the movement of the arm.

8. In an earth bore surveying device, a body adapted to be lowered into the earth bore, recording means carried by said body, means for causing the recording means to operate through a cycle, means whereby stopping of the rotation of the body from an accelerated speed causes the recording means to operate, and means whereby a sudden starting of rotation is ineffective to cause operation of the recording means, comprising an arm, an inertia member for driving the arm, and a friction clutch between the arm and said member.

9. In a device of the character described, a body adapted to be lowered into an earth bore, and direction recording means carried by said body, including a plumb bob, a compass, a source of motion, control mechanism connected to said source, for cyclically causing to plumb bob and compass to perform a recording act, means whereby a succession of blank record spaces is intermittently provided for receiving the record, and means under the control of the operator for initiating the operation of a recording cycle, said means comprising a heavy liquid, a paddle wheel in the liquid, and a trip mechanism operated from the paddle wheel, whereby upon rotation of the body and stopping it, the paddle wheel is driven to unlock the source of motion.

10. In a device of the character described, means providing a record blank, a compass structure below the blank, a plumb bob above the blank, and mechanism for dropping the bob on the blank to mark it, and for raising the compass structure to mark the reverse side thereof.

11. In a device of the character described, means providing a record blank, a compass structure below the blank, a bearing for the structure, a marker carried by the structure, a spring urging the structure toward the blank, and to lift the structure from the bearing, and means for successively freeing the structure from the spring to allow the compass to rest on the bearings and subsequently to allow the spring to urge the marker against the blank.

FRANK RIEBER.